United States Patent
Dukan

(10) Patent No.: US 12,517,131 B2
(45) Date of Patent: Jan. 6, 2026

(54) METHODS FOR LABELING EUKARYOTIC CELLS FROM A MULTICELLULAR ORGANISM AS WELL AS FOR TREATING AND/OR DIAGNOSING A CANCER USING MODIFIED MONOSACCHARIDE COMPOUNDS

(71) Applicant: DIAMIDEX, Marseilles (FR)

(72) Inventor: Sam Dukan, Marseilles (FR)

(73) Assignee: DIAMIDEX, Marseilles (FR)

( * ) Notice: Subject to any disclaimer, the term of this patent is extended or adjusted under 35 U.S.C. 154(b) by 1083 days.

(21) Appl. No.: 17/432,331

(22) PCT Filed: Feb. 20, 2020

(86) PCT No.: PCT/EP2020/054567
§ 371 (c)(1),
(2) Date: Aug. 19, 2021

(87) PCT Pub. No.: WO2020/169782
PCT Pub. Date: Aug. 27, 2020

(65) Prior Publication Data
US 2022/0146516 A1    May 12, 2022

(30) Foreign Application Priority Data
Feb. 20, 2019    (EP) .................................... 19305202

(51) Int. Cl.
| | | |
|---|---|---|
| *G01N 33/574* | (2006.01) | |
| *C07H 3/02* | (2006.01) | |
| *G01N 33/532* | (2006.01) | |
| *G01N 33/58* | (2006.01) | |
| *G01N 33/84* | (2006.01) | |

(52) U.S. Cl.
CPC ......... *G01N 33/57488* (2013.01); *C07H 3/02* (2013.01); *G01N 33/532* (2013.01); *G01N 33/574* (2013.01); *G01N 33/58* (2013.01); *G01N 33/84* (2013.01)

(58) Field of Classification Search
CPC combination set(s) only.
See application file for complete search history.

(56) References Cited

U.S. PATENT DOCUMENTS

2007/0190597 A1    8/2007    Agnew et al.

FOREIGN PATENT DOCUMENTS

| EP | 2617833 | 7/2013 |
| EP | 3 170 830 | 5/2017 |
| WO | 2011/057295 | 5/2011 |
| WO | 2012/021390 | 2/2012 |
| WO | 2013/107759 | 7/2013 |
| WO | 2016/177712 | 11/2016 |
| WO | 2017/062800 | 4/2017 |

OTHER PUBLICATIONS

Moses JE, Moorhouse AD. The growing applications of click chemistry. Chem Soc Rev. Aug. 2007;36(8):1249-62. doi: 10.1039/b613014n. Epub May 3, 2007. Erratum in: Chem Soc Rev. Dec. 21, 2016;45(24):6888. doi: 10.1039/c6cs90108e. PMID: 17619685. (Year: 2007).*
Chen A, Han Y, Wu R, Yang B, Zhu L, Zhu F. Palladium-catalyzed Suzuki-Miyaura cross-couplings of stable glycal boronates for robust synthesis of C-1 glycals. Nat Commun. Jun. 19, 2024;15(1):5228. doi: 10.1038/s41467-024-49547-9. PMID: 38898022; PMCID: PMC11187158. (Year: 2024).*
Kim E, Koo H. Biomedical applications of copper-free click chemistry: in vitro, in vivo, and ex vivo. Chem Sci. Aug. 16, 2019;10(34): 7835-7851. doi: 10.1039/c9sc03368h. PMID: 31762967; PMCID: PMC6855312. (Year: 2019).*
Smyslova P, Popa I, Lyčka A, Tejral G, Hlavac J. Non-Catalyzed Click Reactions of ADIBO Derivatives with 5-Methyluridine Azides and Conformational Study of the Resulting Triazoles. PLoS One. Dec. 16, 2015;10(12):e0144613. doi: 10.1371/journal.pone.0144613. PMID: 26673606; PMCID: PMC4690608. (Year: 2015).*
Hsu TL, Hanson SR, Kishikawa K, Wang SK, Sawa M, Wong CH. Alkynyl sugar analogs for the labeling and visualization of glycoconjugates in cells. Proc Natl Acad Sci U S A. Feb. 20, 2007;104(8):2614-9. doi: 10.1073/pnas.0611307104. Epub Feb. 12, 2007. PMID: 17296930; PMCID: PMC1815231. (Year: 2007).*
Han HH, Wang HM, Jangili P, Li M, Wu L, Zang Y, Sedgwick AC, Li J, He XP, James TD, Kim JS. The design of small-molecule prodrugs and activatable phototherapeutics for cancer therapy. Chem Soc Rev. Feb. 6, 2023;52(3):879-920. doi: 10.1039/d2cs00673a. PMID: 36637396. (Year: 2023).*
https://www.cancer.gov/publications/dictionaries/cancer-terms/def/chemotherapeutic-agent (Year: 2024).*
International Search Report and Written Opinion of the ISA for PCT/EP2020/054567, Apr. 7, 2020, 18 pages.
Sherratt et al., "Copper-catalysed cycloaddition reactions of nitrones and alkynes for bioorthogonal labelling of living cells", RSC Adv, vol. 4, No. 87, Jan. 1, 2014, pp. 46966-46969.
Laughlin et al., "Metabolic Labeling of Glycans with Azido Sugars for Visualization and Glycoproteomics", Biomembranes: Transport theory : cells and model membranes; Glycobiology, vol. 415, Nov. 14, 2006, pp. 230-250.
Xiao-Peng et al., "Carbohydrate CuAAC click chemistry for therapy and diagnosis", Carbohydrate Research, vol. 429, Mar. 29, 2016, pp. 1-22.

\* cited by examiner

*Primary Examiner* — Jeffrey Stucker
*Assistant Examiner* — Laura Ann Essex
(74) *Attorney, Agent, or Firm* — NIXON & VANDERHYE, PC

(57) ABSTRACT

The present invention relates to modified monosaccharide compounds implemented in methods for labeling and/or detecting an eukaryotic cell from a multicellular organism. It also relates to such modified monosaccharide compounds implemented in methods for identifying or isolating cancer cells, diagnosing a cancer or for cell therapy.

4 Claims, 1 Drawing Sheet

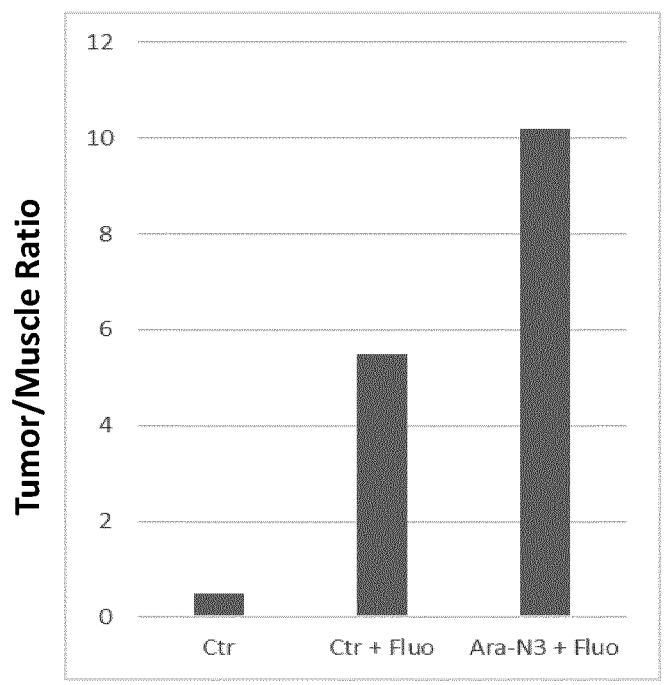

METHODS FOR LABELING EUKARYOTIC CELLS FROM A MULTICELLULAR ORGANISM AS WELL AS FOR TREATING AND/OR DIAGNOSING A CANCER USING MODIFIED MONOSACCHARIDE COMPOUNDS

This application is the U.S. national phase of International Application No. PCT/EP2020/054567 filed 20 Feb. 2020, which designated the U.S. and claims priority to EP patent application Ser. No. 19/305,202.4 filed 20 Feb. 2019, the entire contents of each of which are hereby incorporated by reference.

FIELD OF THE INVENTION

The present invention relates to the medicinal field, in particular of oncology. It relates to modified monosaccharide compounds implemented in methods for labeling and/or detecting and/or targeting an eukaryotic cell from a multicellular organism. It also relates to such modified monosaccharide compounds implemented in methods for identifying or isolating cancer cells, diagnosing a cancer or for cell therapy.

BACKGROUND OF THE INVENTION

Carbohydrates are important as signaling molecules and for cellular recognition events. Indeed, they can produce multivalent interactions with carbohydrate recognition proteins (CRPs) and be used as probes of living organisms. Carbohydrates thus present many opportunities in disease diagnosis and therapy. As a consequence, the development of carbohydrate-based bioactive compounds and sensors has become an active research area. An effective and modular synthetic approach to prepare functional carbohydrates derivatives is click chemistry. Some carbohydrate derivatives prepared by CuAAC (Cu-catalyzed azide-alkyne 1,3-dipolar cycloaddition) click chemistry for therapy and diagnosis are reported in the review from He et al. (Carbohydrate Research 429 (2016) 1-22). The copper-free click chemistry using the strain-promoted azide-alkyne cycloaddition reaction has also been described for cancer cells. Specific sugars presenting clickable groups (e.g., triacetyl N-azidoacetyl-mannosamine ($Ac_3ManNAz$) analogs) are metabolized by cancer cells due to specific overexpressing enzyme-cleavable sugar analogs. Said sugars are thus metabolized and incorporated into cancer cell membranes specifically.

Even if a variety of carbohydrate/monosaccharide click chemistry has been described for therapy and diagnosis, these click chemistry methods and the compounds used therein appear to be cytotoxic and/or not selective to specific cells, such as selective to cancer cells. Cytotoxicity of these compounds implies to use low non-toxic concentrations which render them less effective.

WO2013/1077559 describes modified monosaccharide compounds, such as the specific compound 8-azido-3,8-dideoxy-D-manno-octulosonic acid (also called herein "KDO-$N_3$") in methods for labeling specifically living microorganisms. The labeled living microorganisms have been limited to unicellular prokaryotic microorganisms (bacteria).

WO2016/177712 also describes modified monosaccharide compounds, such as the specific compound 5-azido-5-deoxy-D-arabinofuranose (also called herein "Ara-$N_3$") in methods for labeling specifically living microorganisms. The labeled living microorganisms have been limited to unicellular prokaryotic microorganisms (bacteria) and unicellular eukaryotic microorganisms (yeast, fungi and amoebas).

However, so far, no explanation can be provided on how and where said monosaccharide compounds are assimilated by cellular membranes of said microorganisms.

There is a constant need to find and develop new candidates, especially for labeling and detecting eukaryotic cell from multicellular organisms, to provide methods for identifying or isolating cancer cells, and to provide methods of diagnosis or cell therapy, particularly in the cancer field.

SUMMARY OF THE INVENTION

The present invention is based on monosaccharides compounds of formula (I) or a precursor thereof:

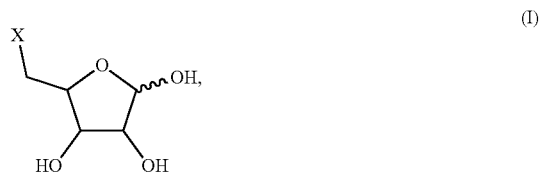

(I)

in which X is a reactive group allowing to covalently link a further compound, such as a label or an anti-cancer drug or particles comprising an anti-cancer drug, via a click chemistry reaction. The formed conjugates may be thus implemented in methods for labeling or detecting eukaryotic cells from a multicellular organism, for identifying or isolating cancer cells, or for treating a cancer.

More particularly, the inventors have found that assimilation of the monosaccharides compounds of formula (I), especially Ara-$N_3$, occurs with eukaryotic cell from a multicellular organism. They have also found that such assimilation in tumoral eukaryotic cells was different from non-tumoral eukaryotic cells and also more important compared to non-tumoral cells (in particular for bladder, blood, skin, pancreas, brain, liver, kidney, lung, muscle, lymphocyte, prostate, stomach, breast cancer compared to non-cancer cells). Therefore, the monosaccharides compounds of formula (I) and the precursors thereof can also be used as cancer probes and markers which can be useful for identifying, isolating or targeting cancer cells, and/or for diagnosing a cancer in a subject.

Accordingly, an aspect of the present invention is a method, preferably an in vitro method, for labeling or detecting or targeting an eukaryotic cell from a multicellular organism, the method comprising the steps of:

a) contacting a sample comprising eukaryotic cells with at least one modified monosaccharide compound or a precursor thereof;

b) contacting the sample of step (a) with a compound bearing a first reactive group, optionally in presence of copper; and c) optionally detecting the compound of step (b) bond to the monosaccharide of step (a), as to detect eukaryotic cells;

wherein said at least one modified monosaccharide compound has the following formula (I):

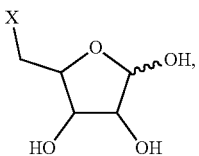
(I)

in which X is a second reactive group, the first and the second reactive groups are able to react together in a click chemistry reaction, as to obtain the compound of step (b) bond to the said monosaccharide. In a preferred embodiment, the first reactive group is an alkyne group and the second reactive group X is an azido group (—$N_3$).

A further aspect of the invention is a kit for implementing the method for labeling, detecting or targeting an eukaryotic cell as defined herein, comprising:
- a modified monosaccharide compound of formula (I) or a precursor thereof, preferably of formula (I'), and
- a compound bearing a first reactive group.

A further aspect of the invention is a method for identifying or isolating cancer cells or for diagnosing a cancer in a subject, comprising implementing a method for labeling, detecting, or targeting an eukaryotic cell from a multicellular organism, as defined herein, from said subject, preferably in a biological sample from said subject.

A further aspect of the invention is a composition comprising an eukaryotic cell presenting on its surface at least one modified monosaccharide compound of formula (I) or a precursor thereof, preferably of formula (I'), as defined herein, operably linked or not to an anti-cancer drug or to particles comprising at least one anti-cancer drug. Another aspect is a pharmaceutical composition comprising such cell. Another aspect is such pharmaceutical composition for use in treating a cancer, especially by cell-based therapy. Another aspect is such pharmaceutical composition for use in diagnosing a cancer.

Another aspect of the invention is a method for treating a cancer in a subject in need thereof, comprising administering to said subject an efficient amount of a composition, as defined herein, comprising an eukaryotic cell presenting on its surface at least one modified monosaccharide compound of formula (I) or a precursor thereof, preferably of formula (I'), as defined herein, operably linked to an anti-cancer drug or to particles comprising at least one anti-cancer drug.

A further aspect of the invention is a use of a modified monosaccharide compound or a precursor thereof as defined herein for medical imaging or diagnosis, preferably for diagnosing a cancer, optionally with a compound bearing a first reactive group.

DESCRIPTION OF THE FIGURES

FIG. 1: Ex vivo fluorescence signal ratio of tumor and skeletal muscle (Tumor/Muscle ratio) obtained with Panc-1 tumor-bearing mice iv injected or not by Ara-$N_3$ and a fluorophore.

DETAILED DESCRIPTION OF THE INVENTION

Definitions

According to the present invention, the terms below have the following meanings: A "multicellular organism" comprises any organism comprising more than one cell. A multicellular organism derives from or is, for instance, a plant or an animal, preferably a mammal, more preferably a human.

As used herein, the terms "patient" and "subject" can be used interchangeably and include both humans and animals, more specifically humans.

An "eukaryotic cell from a multicellular organism" is a cell having a nucleus within membranes, unlike prokaryotes, and coming from a multicellular organism, such as animal or plant cells. Animals and plant cells are the most familiar eukaryotes cells from a multicellular organism. In the context of the present invention, "eukaryotic cells" include cancer cells or normal cells (or non-tumoral and tumoral cells).

Cancer cells are cells that divide relentlessly, forming solid tumors or flooding the blood with abnormal cells. It can thus be a solid cancer or a hematopoietic cancer, such as lymphoma or leukemia.

The term "cancer" or "tumor", as used herein, refers to the presence of cells possessing characteristics typical of cancer-causing cells, such as uncontrolled proliferation, immortality, metastatic potential, rapid growth and proliferation rate, and certain characteristic morphological features. This term refers to any type of malignancy (primary or metastases). Typical cancers are solid or hematopoietic cancers such as breast, brain, stomach, liver, skin, prostate, pancreatic, oesophageal, sarcoma, ovarian, endometrium, bladder, cervix uteri, rectum, colon, renal, lung or ORL cancers, paediatric tumors (neuroblastoma, glioblastoma multiforme), lymphoma, carcinoma, glioblastoma, hepatoblastoma, leukemia, myeloma, seminoma, Hodgkin or malignant hemopathies.

The present invention relates to a method for labeling or detecting or targeting an eukaryotic cell from a multicellular organism, the method comprising the steps of:
a) contacting a sample comprising eukaryotic cells with at least one modified monosaccharide compound or a precursor thereof;
b) contacting the sample of step (a) with a compound bearing a first reactive group, optionally in presence of copper; and
c) optionally comprising detecting the compound of step (b) bond to the monosaccharide of step (a);

wherein said at least one modified monosaccharide compound has the following formula (I):

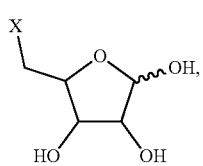
(I)

in which X is a second reactive group, the first and the second reactive groups can react together in a click chemistry reaction. The reaction between the first and the second reactive groups allows the compound of step (b) to be bond to the monosaccharides of formula (I).

Click chemistry is a well-known method from a skilled person for attaching a probe or a substrate of interest to a specific biomolecule, such as a modified monosaccharide compound according to the invention. An azide alkyne cycloaddition is a well-known so-called click chemistry reaction, in the presence or not of a copper catalyst, in which the azide group reacts with the alkyne group to afford a triazole. The alkyne group can be strained or not.

Such azide alkyne cycloaddition can be performed in copper catalyzed conditions in the presence of a ligand, preferably a tris-triazole ligand such as TGTA (Tris((1-(-D-glucopyranosyl)-1 [1,2,3]-triazol-4-yl)methyl)amine) or TBTA (Tris-[(1-benzyl-1 1,2,3-triazol-4-yl) methyl]amine). Other appropriate ligands frequently used are: tris(3-hydroxypropyl triazolylmethyl)amine (THPTA), 2-(4-((bis((1-tert-butyl-1 1,2,3-triazol-4-yl)methyl)amino)methyl)-1H-1, 2,3-triazol-1-yl)ethanesulfonic acid (BTTES), tris((1-(((ethyl) carboxymethyl)-(1,2,3-triazol-4-yl)) methyl) amine, bathophenanthroline disulfonate, or tris(2-benzimidazolylmethyl)amines.

Alternatively, azide alkyne cycloaddition can be performed in the absence of copper, if a strained alkyne is used, such as azadibenzocyclooctyne (ADIBO, DIBAC or DBCO) or tetramethoxydibenzocyclooctyne (TMDIBO). Other appropriate strained alkynes frequently used for copper-free reaction include: cyclooctyne (OCT), aryl-less cyclooctyne (ALO), monofluorocyclooctyne (MOFO), difluorocyclooctyne (DIFO), dibenzocyclooctyne (DIBO), dimethoxyazacyclooctyne (DIMAC), biarylazacyclooctynone (BARAC), bicyclononyne (BCN), tetramethylthiepinium (TMTI, TMTH), difluorobenzocyclooctyne (DIFBO), oxa-dibenzocyclooctyne (ODIBO), carboxymethylmonobenzocyclooctyne (COMBO), or benzocyclononyne.

Other reactive groups and other reactions are possible for click chemistry, such as: Staudinger Ligation (first reactive group=azide and second reactive group=phosphine), copper-free click-chemistry (first reactive group=azide and second reactive group=constrained alkyne (intracyclic alkyne)), carbonyl condensation (first reactive group=aldehyde or ketone and second reactive group=hydrazide or oxyamine), thiol-ene click chemistry (first reactive group=thiol and second reactive group=alkene), nitrile-oxide-ene click chemistry (first reactive group=nitrile oxide or aldehyde, oxime, or hydroxymoyl chloride or chlororoxime and second reactive group=alkene or alkyne), nitrile imine-ene click chemistry (first reactive group=nitrile imine or aldehyde, hydrazone, or hydrazonoyl chloride or chlorohydrazone and second reactive group=alkene or alkyne), inverse electron demand Diels-Alder ligation (first reactive group=alkene and second reactive group=tetrazine), isonitrile-tetrazine click chemistry (first reactive group=isonitrile and second reactive group=tetrazine), Suzuki-Miyaura coupling (first reactive group=aryl halide and second reactive group=aryl boronate), His-tag (first reactive group=oligo-histidine and second reactive group=nickel-complex or nickel ligand).

Monosaccharide Compounds and Precursors Thereof

According to the invention, the modified monosaccharide compound of formula (I) comprises a reactive group X (second reactive group) suitable for reacting in a click chemistry reaction, preferably in an azide alkyne cycloaddition. Thus, X includes any reactive group able to react with a further reactive group by a click chemistry reaction such as reactive groups as above defined. In a particular embodiment X comprises any groups consisting in or bearing an azido group (—N$_3$) and groups consisting in or bearing an alkyne group (—C≡C—) strained or not. In a preferred embodiment, X is an azido group (—N$_3$).

In a particular embodiment of the invention, the modified monosaccharide compounds of formula (I) comprises the diastereoisomers thereof. In a further particular embodiment, said modified monosaccharide compound of formula (I) is selected in the group consisting of the following formulae:

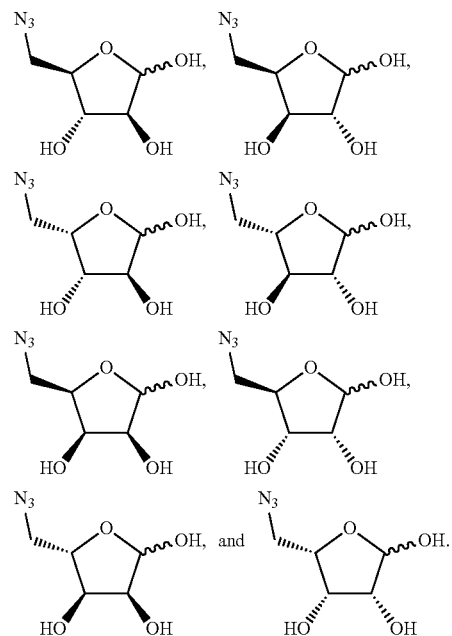

In a preferred embodiment, said at least one modified monosaccharide compound of formula (I) is 5-azido-5-deoxy-D-arabinofuranose (Ara-N$_3$), in particular having the following formula:

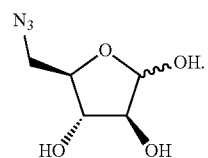 [SMILES: [N-]=[N+]=NC[C@H]1OC(O)[C@@H](O)[C@@H]1O]

In a further particular embodiment of the invention, the at least one modified monosaccharide compounds of formula (I) is a precursor of said modified monosaccharide compounds. More particularly, said precursor is of formula (I'):

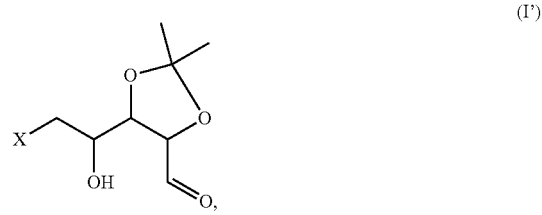

(I')

in which X is a second reactive group as above defined, preferably an azido group (—N$_3$), the first and the second reactive group may react together in a click chemistry reaction.

In a further particular embodiment, said precursor of formula (I') comprises the diastereoisomers thereof. In a further particular embodiment, said precursor of the formula (I') is selected in the group consisting of the following formulae:

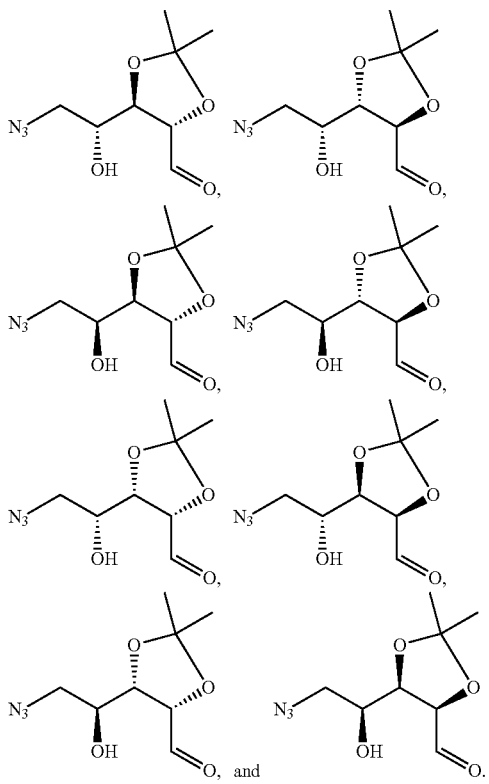

In a preferred embodiment, said precursor of the formula (I') is 5-azido-5-deoxy-2:3-isopropylidene-D-arabinose having the following formula:

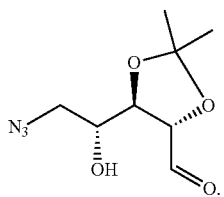

The modified monosaccharide compound of formula (I) or its precursor can be used according to the present invention at any concentration since it does not present toxicity towards cells. According to a particular embodiment, the concentration of the monosaccharide compound of formula (I) or its precursor of the invention can vary from 10 µM to 100 mM, preferably from 1 mM to 50 mM, more preferably from 1 mM to 20 mM.

The Compound Bearing a First Reactive Group

The compound bearing a first reactive group comprises or is a directly detectable moiety or comprises or is an indirectly detectable moiety. Without being bound to any theory, the cells are coupled to the compound bearing a first reactive group due to the click reaction with the second reactive group of the monosaccharide of step (a) which has been assimilated by the cell membranes at step (a). The detectable moiety (or label), namely a moiety capable to be detected by techniques known by one skilled in the art, such as fluorescence, colorimetry or luminescence. The imaging techniques can thus be fluorescence, magnetic resonance or computed tomography.

According to one embodiment, said compound can comprise or can be a detectable moiety, namely a moiety consisting in or bearing a detectable substance (or a label), namely a substance capable to be detected by techniques known by one skilled in the art, such as fluorescence, colorimetry or luminescence.

According to another embodiment, said compound bearing a first reactive group comprises or is an indirectly detectable moiety which is a first ligand (or more specifically a first binding protein bearing a said first reactive group) and detection and/or immobilizing in step (c), as detailed below, can occur by contacting said eukaryotic cell coupled to said first ligand (or more specifically first binding protein) with a second ligand (or second binding protein) reacting or binding specifically to said first ligand (or more specifically first binding protein).

More particularly, said compound is a first ligand, preferably biotin, bearing a said first reactive group, and in step c) said eukaryotic cells coupled to said first ligand are detected by reaction of said eukaryotic cells with an antibody or another protein specific to said first ligand, said antibody bearing a detectable substance or moiety, preferably a fluorochrome or luminescent molecule or an enzyme.

The detectable substance or moiety can be selected among dyes, radiolabels and affinity tags. In particular, the dyes can be selected from the group consisting of fluorescent, luminescent or phosphorescent dyes, preferably dansyl, fluorescein, acridine, rhodamine, coumarin, BODIPY and cyanine dyes. More specifically, the fluorescent dyes can be selected among the dyes marketed by Thermo Fisher such as the Alexa Fluor dyes, Pacific dyes or Texas Red or by other providers for cyanines 3, 5 and 7. In particular, dyes bearing azide for CuAAC are commercially available for Alexa Fluor® 488, 55, 594 and 647 and for TAMRA (tetramethylrhodamine). In a second aspect, the detectable substance or moiety (or label) can be an affinity tag. Such an affinity tag can be for instance selected from the group consisting of biotin, His-tag, Flag-tag, strep-tag, sugars, lipids, sterols, PEG-linkers, and co-factors. In a particular embodiment, the detectable substance is a biotinylated label. Biotins linked to azide are commercially available (Biotin azide). In a preferred embodiment, the label is a fluorescent label.

According to the invention, the compound bearing a first reactive group comprises a first reactive group which is complementary with a second reactive group X as above defined for reacting together in a click chemistry reaction, preferably an azide alkyne cycloaddition. In a particular embodiment, the first reactive group of the compound comprises any group consisting in or bearing an azido group (—N₃) and groups consisting in or bearing a strained or not alkyne group (—C≡C—).

In the above-mentioned listing of groups involved in the reactions, the first reactive group and the second reactive group X can be permuted. All the above-mentioned chemical reactions result in a covalent link. For instance, when X is an azido group (—N₃) or a group bearing an azido group, then the first reactive group is an alkyne or a group bearing an alkyne group. When X is an alkyne or a group bearing an alkyne group, then the first reactive group is an azido group (—N₃) or a group bearing an azido group. In a preferred embodiment of the invention, the second reactive group X is an azido group (—N₃) and the first reactive group is an alkyne group (—C≡C—).

Method for Labeling, Detecting or Targeting

The step a) according to the method for labeling, detecting or targeting an eukaryotic cell from a multicellular organism comprises contacting a sample comprising an eukaryotic cell with at least one modified monosaccharide compound of formula (I) or a precursor thereof comprising a reactive or a functional group X. Such contacting step a) allows the incorporation of the at least one modified monosaccharide compound of formula (I) or a precursor thereof in the membrane of said eukaryotic cell from a multicellular organism, more specifically on the surface of said cell. Such process may correspond to an assimilation of the at least one modified monosaccharide compound of formula (I) by said eukaryotic cell. Accordingly, said cell presents the at least one modified monosaccharide compound of formula (I) on its surface or membrane.

The step b) comprises contacting the sample of step (a) (in which the at least one modified monosaccharide compound of formula (I) or a precursor thereof is incorporated in the membrane of an eukaryotic cell) with a compound comprising a first reactive group as above defined. Such step b) allows to generate the click chemistry reaction between the first reactive group of the compound and the second reactive group X of the at least one modified monosaccharide compound of formula (I) or its precursor, preferably of formula (I'), thereby providing a coupled eukaryotic cell from a pluricellular organism which is labelled or targeted or can be labelled or targeted thereafter (as detailed above).

A preferred embodiment of the invention is a method for labeling, detecting or targeting an eukaryotic cell from a multicellular organism, the method comprising the steps of:
 a) contacting a sample comprising an eukaryotic cell with Ara-$N_3$; and
 b) contacting said sample with a compound comprising a first reactive group, optionally in presence of copper.

One skill in the art knows how to implement steps (a) or (b). According to a particular embodiment, said steps (a) and/or (b) are carried out in culture or incubation media allowing the growth of the sample comprising an eukaryotic cell, preferably specific to the growth of the said eukaryotic cell.

More specifically, the culture conditions (including time and cell culture medium) of steps (a) or (b) are adapted to the eukaryotic cell to be labelled, detected or targeted. The cell culture medium can be supplemented by any compound to enhance or stimulate doubling of cells and/or assimilation of the modified monosaccharide compound of formula (I) on the surface or membrane of the cell.

According to a particular embodiment, the duration of step (a) allows the incorporation of the at least one monosaccharide compound of formula (I) or a precursor thereof in the membrane of said eukaryotic cell. More specifically, duration of step (a) is at least the doubling time of the eukaryotic cell to be labelled, detected or targeted. More particularly, duration of step (a) is less than five times the doubling time of the eukaryotic cell to be labelled, detected or targeted. According to a particular embodiment, duration of step (a) corresponds to one doubling time or two doubling times of the eukaryotic cell to be labelled, detected or targeted.

According to a particular embodiment, said steps (a) and/or (b) are carried out with reactants and/or catalysts for generating the reaction of said first reactive group with said second reactive group.

It is interesting to note that the monosaccharide compound of formula (I) or a precursor thereof present a low or no toxicity towards cells as illustrated by the examples, so that the used amount thereof can vary in a large range. Such amount will be determined by one skilled in the art so that the amount is sufficient to label, identify or detect eukaryotic cells.

The method may be implemented with any sample, typically a biological sample of a subject, e.g. a fluid, such as a sample of blood, plasma, serum, urine, cerebrospinal fluid or a sample from a tissue of a subject or a part thereof. The invention may be implemented with samples from any subject, including any human patient having or suspected to have cancer. The method is typically performed on a sample of, or derived from, blood, serum or plasma, such as a pre-treated blood sample. The sample may be treated prior to being used in the invention (e.g., diluted, concentrated, separated, partially purified, frozen, etc.). According to a particular embodiment, each sample used at step (a) of the method comprises a cell population or preferably an individual cell, preferably obtained by cell sorting, in particular by flow cytometry. When the method is implemented in vivo, the method can be implemented to the whole body of the subject or a part thereof. In that context, the monosaccharide compound of formula (I) or a precursor thereof and optionally the compound bearing a first reactive group can be administered enterally (including orally) or parenterally (including intravenously or intramuscularly).

In order to detect the coupled eukaryotic cell from a pluricellular organism, the method further includes a step c) comprising detecting the compound of step (b) bond to the monosaccharide of step (a).

Advantageously, the present invention comprises the further step (c) of detecting an eukaryotic cell in detecting whether said eukaryotic cell is coupled with the compound bearing the first reactive group of step (b) and/or in immobilizing said eukaryotic cell coupled with the compound bearing the first reactive group onto a solid substrate, wherein said compound bearing the first reactive group is a moiety or molecule comprising a detectable substance or capable to react or to be bound to a detectable substance or preferably said compound bearing the first reactive group is a first molecule being capable to react or to be bound to a second molecule and/or to a solid substrate, preferably said second molecule comprising a detectable substance and/or said second molecule being bound or capable to be bound to a said solid substrate.

Accordingly, the present invention enables labeling of eukaryotic cells from a multicellular organism as well as numbering or detecting of eukaryotic cells as well as concentrating and/or isolating eukaryotic cells, optionally immobilized on a solid support; especially with a solid support constituted of magnetic beads bearing the said first reactive group.

More particularly, said compound bearing the first reactive group is a first molecule being capable to react or to be bound to a second molecule and/or to a solid substrate, preferably said second molecule comprises a detectable substance, the method comprising the step c) of detecting eukaryotic cells in detecting whether said eukaryotic cell comprises said detectable molecule or moiety bound to said eukaryotic cell.

According to the method of the present invention, in absence of labeling or detection, one can conclude that the implemented sample does not comprise any eukaryotic cell from a pluricellular organism.

The said detecting step c) can be carried out in a liquid medium or on a solid substrate.

Preferably, the method for labeling or detecting or targeting a eukaryotic cell from a multicellular organism is an in vitro method.

According to a particular embodiment, the method of the present invention can further comprise one or more washing steps.

According to a particular embodiment, the method according to the invention can be carried out with one or more samples simultaneously, using for instance a microwell plate. The microplate typically has 6, 12, 24, 48, 96, 384 or 1536 sample wells. According to said particular embodiment, each sample well used at step (a) of the method preferably comprises a cell population or preferably an individual cell, more preferably obtained by cell sorting, in particular by flow cytometry.

A further object of the invention is thus an in vitro use of at least one modified monosaccharide compound of formula (I) or a precursor thereof, preferably of formula (I'), for labeling or detecting an eukaryotic cell from a pluricellular organism, preferably with a compound comprising a first reactive group, and optionally with a second molecule and/or to a solid substrate, preferably said second molecule comprising a detectable substance.

A further object of the invention is a kit for implementing a method for labeling or detecting an eukaryotic cell from a multicellular organism as defined herein comprising:
- a modified monosaccharide compound of formula (I) or a precursor thereof, preferably of formula (I'), as defined above, and
- a compound bearing a first reactive group, as defined above.

According to a particular embodiment, the kit can further comprise a second molecule and/or a solid substrate, as defined above, preferably said second molecule or solid substrate comprising a detectable substance, the compound bearing the first reactive group being a first molecule capable to react or to be bound to the second molecule and/or to the solid substrate.

A further object is a use of a kit as defined above for implementing a method for labeling or detecting an eukaryotic cell from a multicellular organism as defined herein.

According to a particular embodiment, the eukaryotic cell from a multicellular organism is a cell susceptible to be a cancer or tumoral cell. Accordingly, the method and the kit according to the invention are useful to identify cancer or tumoral cells by detection of labeling.

Method for Identifying or Isolating Cancer Cells or Diagnosing Cancer

The present invention further relates to a method, preferably an in vitro or ex vivo method, for identifying or isolating cancer cells or diagnosing a cancer in a subject comprising implementing a method for labelling or detecting an eukaryotic cell as defined herein of said subject or of a biological sample from said subject. In a preferred embodiment, the method for identifying or isolating cancer cells or for diagnosis a cancer in a subject further comprises the step of detecting the labeling and optionally comparing the labeling to a reference level.

The biological sample from a subject is as defined above, and preferably the sample is a sample from a human patient having or suspected to have cancer. According to a particular embodiment, each sample used at step (a) comprises a cell population or preferably an individual cell, preferably obtained by cell sorting, in particular by flow cytometry.

The sample is more specifically suspected to comprise cancer cells.

Examples of such samples include fluids such as blood, plasma, saliva, urine and seminal fluid samples, as well as biopsies, organs, tissues or cell samples. The sample may be treated prior to its use.

Cancer cells that are identified or isolated according to the invention can be of any type. They can come from solid tumors or hematopoietic cancers. Cancer cells include circulating or non-circulating tumor cells. Circulating tumor cells (CTCs) are cells that have shed into the vasculature or lymphatics from a primary tumor and are carried around the body in the blood circulation. CTCs constitute seeds for the subsequent growth of additional tumors (metastases) in distant organs, a mechanism that is responsible for the vast majority of cancer-related deaths.

The detection and analysis of cancer cells according to the present invention can assist early patient prognoses and determine appropriate tailored treatments. The ability to monitor the disease progression over time can facilitate appropriate modification to a patient's therapy, potentially improving their prognosis and quality of life. In case of detection and analysis of circulating tumor cells, the method can allow early detection of cancers and in particular metastases. In that respect, the sample according to the invention is a blood fluid. Blood tests are easy and safe to perform and multiple samples can be taken over time. The important aspect of the ability to prognose the future progression of the disease is elimination (at least temporarily) of the need for a surgery when the repeated CTC counts are low and not increasing; the obvious benefits of avoiding the surgery include avoiding the risk related to the innate tumor-genicity of cancer surgeries. To this end, technologies, as the present invention, with the requisite sensitivity and reproducibility to detect CTCs in patients with metastatic disease are of tremendous interest.

As used herein the expression "detecting the labelling" may include the visualizing, or detecting the presence of labeled eukaryotic cells from a multicellular organism or also the measuring of such labelling. The measuring of such labelling, such as fluorescence, allows to detect, identify or isolate cancer cells, optionally by comparing the labeling to a reference level.

It has been found herein that assimilation of the modified monosaccharide compound of formula (I) or a precursor thereof, preferably of formula (I'), in cancer cells is different from non-cancer cells, and more particularly is higher compared to non-cancer cells (e.g. reference level or control sample). As shown in the examples, the fluorescence intensity is higher for cancer cells compared to non-cancer cells (for instance, after one or two cell doubling time).

Therefore, the present invention relates to a method for identifying or isolating cancer cells or for diagnosis a cancer in a subject comprising:
- implementing a method for labeling an eukaryotic cell as described herein of a sample from said subject;
- detecting the labeling, after implementing of said method for labeling, and optionally comparing the labeling to a reference level; and then
- identifying cancer cells or diagnosing a cancer based on the measuring of the label.

The method for identifying or isolating cancer cells or for diagnosis a cancer can be advantageously performed within one cell cycle period of time. Detection of the label is preferably performed from 10 hours to 40 hours, more preferably from 16 to 24, 25, or to 36 hours after implementing said method for labeling, and more specifically after implementing step (a) as detailed above.

The method can optionally comprise a comparison to a reference level, more specifically to a control sample or reference. The reference level can be the intensity of the labeling (such as fluorescence) measured in a normal cell (e.g. non cancer cell) and/or a known cancer cell. Preferably, the cell of reference is the closest of the cell to be studied, preferably a cell from the same cell line, same organ and/or same type. The method may comprise a previous step of providing a tumor sample and a histologically matched normal tissue from the subject.

According to specific embodiments, the cancer cells are identified or the cancer is diagnosed when the measuring of the label of the sample is higher than the measuring of the label of a control sample which is a non-cancer sample. By "higher measuring", it denotes that the labeling ratio of the sample with respect to the non-cancer sample is more than 1.3, 1.4, 1.5, 1.6, 1.7, 1.8, 1.9, 2.0, 2.1, 2.2, 2.3, 2.4, 2.5, or 3.0. More specifically, the labeling ratio of the sample with respect to the non-cancer sample is more than 1.5, 1.6, 1.7, 1.8, 1.9, 2.0, 2.1, 2.2, 2.3, 2.4, 2.5, or 3.0.

According to a particular embodiment, the cancer to be diagnosed is chosen among rectal cancer, colorectal cancer, stomach cancer, head and neck cancer, thyroid cancer, cervical cancer, uterine cancer, breast cancer, ovarian cancer, brain cancer, lung cancer, skin cancer, bladder cancer, blood cancer, renal cancer, liver cancer, prostate cancer, multiple myeloma, and endometrial cancer. More specifically, the cancer to be diagnosed is selected from the group consisting of: bladder, blood, skin, pancreas, brain, liver, kidney, lung, muscle, lymphocyte, prostate, stomach, and breast cancer. According to a more particular embodiment, the cancer to be diagnosed is selected from the group consisting of: bladder, blood, colon, stomach, breast, lung, skin, and pancreas cancers.

According to a particular embodiment, the cancer cells to be identified or isolated are cancer cells deriving from the above listed cancers.

Pharmaceutical Composition and Uses Thereof

The present invention relates to a composition comprising an eukaryotic cell presenting on its surface at least one modified monosaccharide compound of formula (I) or a precursor thereof, preferably of formula (I'), as above defined, operably linked or not to an anti-cancer drug or to particles comprising at least one anti-cancer drug.

In one particular aspect, the cell presenting on its surface at least one modified monosaccharide compound of formula (I) or a precursor thereof as above defined operably linked or not to an anti-cancer drug or to particles comprising at least one anti-cancer drug can be prepared as described above in the method of the invention.

The composition according to the invention can be prepared by the method comprising the following steps:
a) contacting a composition comprising eukaryotic cells from a multicellular organism with at least one modified monosaccharide compound or a precursor thereof as defined above;
b) contacting the composition of step (a) with a compound bearing a first reactive group and optionally comprising operably linked anticancer drugs or particles comprising at least one anti-cancer drug, optionally in presence of copper.

Said steps are similar to the ones detailed above. Step a) allows said cell to present the at least one modified monosaccharide compound of formula (I) or a precursor thereof on its surface or membrane. Step b) allows to generate the click chemistry reaction between the first reactive group of the compound and the second reactive group X of the at least one modified monosaccharide compound of formula (I) or its precursor, preferably of formula (I').

According to one embodiment, the compound with the first reactive group can also comprise or be an operably linked anticancer drug or particles comprising at least one anti-cancer drug attached to the said compound, step (b) allows to provide eukaryotic cells from a pluricellular organism coupled with anti-cancer drugs or with particles comprising anti-cancer drugs.

The method thus allows to prepare, by a click chemistry reaction as above detailed, a conjugate in which a modified monosaccharide compounds of formula (I) or a precursor of formula (I') thereof is operably linked with the anti-cancer drug or particles comprising the same, and the eukaryotic cell presents on its surface said conjugate. In a particular embodiment, the conjugate is prepared by a click chemistry reaction between anti-cancer drugs comprising alkyne groups or particles presenting on their surface alkyne groups and modified monosaccharide compounds of formula (I) or precursors of formula (I') thereof comprising azido groups.

According to another embodiment, the compound with the first reactive group is a first ligand (or more specifically first binding protein) able to react or bind to a second ligand (or more specifically second binding protein) which is an anti-cancer agent. According to such embodiment, the method allows to prepare, by a click chemistry reaction as above detailed, a conjugate in which a modified monosaccharide compounds of formula (I) or a precursor of formula (I') thereof is linked to a first ligand able to react or bind to a second ligand which is an anti-cancer agent, and the eukaryotic cell presents on its surface said conjugate. In a particular embodiment, the conjugate is prepared by a click chemistry reaction as detailed above.

As used herein an "anti-cancer drug" corresponds to any drug currently used in cancer therapy, such as an antitumoral drug. In a preferred embodiment, the anti-cancer drug is selected from the group consisting of chemotherapeutics, anti-cancer antibodies, hormonal therapy, immunotherapy, and kinase inhibitors.

The terms "operably linked anticancer drug" refers to anticancer drug which is linked, preferably covalently, while being able to present its therapeutic effect.

The particles comprising at least one anti-cancer drug are anti-cancer drug-containing particles, preferably nanoparticles, with first reactive groups as defined above. The particles can be bicyclo[6.1.0]nonyne-modified glycol chitosan nanoparticles (BCN-CNPs), for instance. CNPs are known to be able to encapsulate carious drugs with high compatibility and are widely used for drug delivery.

Chemotherapy may include an inhibitor of topoisomerases I or II, a DNA crosslinker, a DNA alkylating agent, an anti-metabolic agent and/or inhibitor of the mitotic spindles.

Inhibitors of topoisomerases I and/or II include, but are not limited, to etoposide, topotecan, camptothecin, irinotecan, amsacrine, intoplicine, anthracyclines such as doxorubicine, epirubicine, daunorubicine, idanrubicine and mitoxantrone. Inhibitors of Topoisomerase I and II include, but are not limited to, intoplecin.

DNA crosslinkers include, but are not limited to, cisplatin, carboplatin and oxaliplatin.

Anti-metabolic agents block the enzymes responsible for nucleic acid synthesis or become incorporated into DNA, which produces an incorrect genetic code and leads to apoptosis. Non-exhaustive examples thereof include, without limitation, folic acid antagonists, pyrimidine analogs, purine analogs and adenosine deaminase inhibitors, and more particularly Methotrexate, Floxuridine, Cytarabine, 6-Mercaptopurine, 6-Thioguanine, Fludarabine phosphate, Pentostatine, 5-fluorouracil, gemcitabine and capecitabine.

Alkylating agents include, without limitation, nitrogen mustards, ethylenimine derivatives, alkyl sulfonates, nitrosoureas, metal salts and triazenes. Non-exhaustive examples thereof include Uracil mustard, Chlormethine, Cyclophosphamide (CYTOXAN®), Ifosfamide, Melphalan, Chlorambucil, Pipobroman, Triethylenemelamine, Triethylenethiophosphoramine, Busulfan, Carmustine, Lomustine, Fotemustine, cisplatin, carboplatin, oxaliplatin, thiotepa, Streptozocin, Dacarbazine, and Temozolomide.

Inhibitors of the mitotic spindles include, but are not limited to, paclitaxel, docetaxel, vinorelbine, larotaxel (also called XRP9881; Sanofi-Aventis), XRP6258 (Sanofi-Aventis), BMS-184476 (Bristol-Meyer-Squibb), BMS-188797 (Bristol-Meyer-Squibb), BMS-275183 (Bristol-Meyer-Squibb), ortataxel (also called IDN 5109, BAY 59-8862 or SB-T-101131; Bristol-Meyer-Squibb), RPR 109881A (Bristol-Meyer-Squibb), RPR 116258 (Bristol-Meyer-Squibb), NBT-287 (TAPESTRY), PG-paclitaxel (also called CT-2103, PPX, paclitaxel poliglumex, paclitaxel polyglutamate or Xyotax™) ABRAXANE® (also called Nab-Paclitaxel; ABRAXIS BIOSCIENCE), Tesetaxel (also called DJ-927), IDN 5390 (INDENA), Taxoprexin (also called docosahexanoic acid-paclitaxel; PROTARGA), DHA-paclitaxel (also called Taxoprexin®), and MAC-321 (WYETH). Also see the review of Hennenfent & Govindan (2006, Annals of Oncology, 17, 735-749).

The immune checkpoint inhibitor can be selected from the group consisting of an anti-CTLA-4 (cytotoxic T lymphocyte associated protein 4) therapies such as ipilimumab, PD-1 (programmed cell death protein 1) inhibitors such as nivolumab, pembrolizumab, or BGB-A317, PDL1 (programmed cell death ligand) inhibitors such as atezolizumab, avelumab, or durvalumab, LAG-3 (Lymphocyte-activation gene 3) inhibitors such as BMS-986016, TIM-3 (T-cell immunoglobulin and mucin-domain containing-3) inhibitors, TIGIT (T cell immunoreceptor with Ig and ITIM domains) inhibitors, BLTA (B- and T-lymphocyte attenuator) inhibitors, IDO1 inhibitors such as epacadostat, or a combination thereof.

The hormonotherapy includes for instance Tamoxifen, Fareston, Arimidex, Aromasin, Femara, Zoladex/Lupron, Megace, and Halotestin.

The eukaryotic cells from a multicellular organism of the composition according to the invention are preferably isolated non-cancer cells. The cells are preferably isolated multipotent stem cells. The cells are preferably mesenchymal stem cells (MSC). MSC can be found in the whole body, preferably in adipose tissue, bone marrow, tissue supporting the organs, and also in bone, cartilage and muscle, etc. The eukaryotic cells according to the invention can be T-cells.

The cells are either allogenic or preferably autologous cells (i.e. from the subject or patient himself).

According to a particular embodiment, the composition comprises MSC presenting on their surfaces at least one modified monosaccharide compound of formula (I) or a precursor thereof as above defined. Such composition can be useful for instance for identifying cancer cells or tumors or diagnosing cancers by using the property of the monosaccharide to be detected by the compound comprising the first reactive group directly or indirectly as detailed above. Such composition can also be useful in therapy as to monitor hematopoietic transplants.

According to another particular embodiment, the composition comprises MSC presenting on their surfaces at least one modified monosaccharide compound of formula (I) or a precursor thereof as above defined, operably linked to an anticancer drug or to particles comprising at least one anti-cancer drug and attached to the said compound. Such composition can also be useful in therapy, in particular for the treatment of cancers.

The composition of the invention is preferably a pharmaceutical composition.

The pharmaceutical compositions contemplated herein include a pharmaceutically acceptable carrier in addition to the cell presenting the anti-cancer drug as detailed above. The term "pharmaceutically acceptable carrier" is meant to encompass any carrier (e.g., support, substance, solvent, etc.) which does not interfere with effectiveness of the biological activity of the cells and that is not toxic to the host to which it is administered. For example, for parental administration, the active compounds(s) may be formulated in a unit dosage form for injection in vehicles such as saline, dextrose solution, serum albumin and Ringer's solution. The pharmaceutical composition can be formulated as solutions in pharmaceutically compatible solvents or as emulsions, suspensions or dispersions in suitable pharmaceutical solvents or vehicle, or as pills, tablets or capsules that contain solid vehicles in a way known in the art. Formulations suitable for parental administration conveniently comprise a sterile oily or aqueous preparation of the active ingredient which is preferably isotonic with the blood of the recipient.

The carrier must be "acceptable" in the sense of being compatible with the other ingredients of the formulations and not deleterious to the recipient thereof. The pharmaceutical compositions are advantageously applied by injection or intravenous infusion of suitable sterile solutions. Methods for the safe and effective administration of most of these chemotherapeutic agents are known to those skilled in the art. In addition, their administration is described in the standard literature.

The pharmaceutical composition of the invention can be used in cancer therapy, and more specifically in cancer cell therapy.

A preferred embodiment of the invention is a pharmaceutical composition as defined herein for use for treating a cancer as above defined.

A further preferred embodiment, is a method for treating a cancer in a subject in need thereof, comprising administering an efficient amount of a pharmaceutical composition as defined herein.

A further preferred embodiment, is a use of a pharmaceutical composition as defined herein for the manufacture of a medicament for the treatment of cancer.

Imaging and Diagnosis

As above detailed, the modified monosaccharide compound of formula (I) or a precursor thereof of formula (I') is suitable for forming a detectable entity with a label, preferably a fluorescent label, particularly by a click chemistry reaction.

The present invention thus relates to the use of a modified monosaccharide compound of formula (I) or a precursor thereof of formula (I') as disclosed herein as a research tool for detecting an eukaryotic cell from a pluricellular organism, and more particularly to identify or isolate cancer cells. The invention further relates to a modified monosaccharide compound of formula (I) or a precursor thereof of formula (I') as disclosed herein, for medical imaging or diagnosis, preferably for diagnosis a cancer.

Further aspects and advantages of the present invention will be described in the following examples, which should be regarded as illustrative and not limiting.

EXAMPLES

Example 1: Synthesis of Compounds

Materials and Methods:

Thin layer chromatography was performed over Merck 60 F254 with detection by UV, and/or by charring with sulphuric acid or $KMnO_4$ or phosphomolybdic acid solutions. Silica gel 60 40-63 Mm was used for flash column chromatography.

NMR spectra were taken on Bruker Avance 300 or 500 MHz spectrometers, using the residual protonated solvent as internal standard. Chemical shifts δ are given in parts per million (ppm) and coupling constants are reported as Hertz (Hz). Splitting patterns are designated as singlet (s), doublet (d), triplet (t), doublet of doublet (dd), doublet of doublet of doublet (ddd). Splitting patterns that could not be interpreted or easily visualized are designated as multiplet (m).

Mass spectra were taken on a Waters LCT Premier XE (ToF), with electrospray ionization in the positive (ESI+) or in the negative (ESI−) mode of detection.

IR-FT spectra were recorded on a Perkin Elmer Spectrum 100 spectrometer. Characteristic absorptions are reported in $cm^{-1}$.

Specific optical rotations were measured at 20° C. with an Anton Paar MCP 300 polarimeter in a 10-cm cell at 20° C. and 589 nm.

All biological and chemical reagents were of analytical or cell culture grade, obtained from commercial sources, and used without further purifications.

Ara-$N_3$ and the precursor thereof VI have been synthesized according to the following procedure:

sulfonic acid (1.01 g, 5.33 mmol, 0.2 eq.) was added and the suspension was heated to reflux for 4 hours followed by further 15 hours of stirring at room temperature. The reaction mixture was filtered over Celite® and solvents were evaporated. The residue was dissolved in ethyl acetate (200 mL) and was washed with saturated aq. NaCl solution (2×150 mL). Purification by silica flash column chromatography (cyclohexane/ethyl acetate 9:1) yields a mixture of isomers 2:3,4:5-diisopropylidene-D-arabinose O-methyloxime (IIE/IIZ) and an unknown impurity (NMR ratio 6:1:0.4, 5.83 g) as colorless oil. This mixture was used without further purification in the next step. An aliquot of pure (2E) was obtained by a second flash column chromatography (dichloromethane/MTBE 98:2) and characterized.

Isomer (IIE):

Rf ($CH_2Cl_2$/MTBE 98:2): 0.35.

IR ($cm^{-1}$): 2987, 2939, 2900, 2821, 1631, 1456, 1381, 1371, 1241, 1212, 1150, 1065, 1038, 887, 842.

$^1$H-NMR (500 MHz, $CDCl_3$) δ: 7.35 (d, 1H, $J_{1,2}$ 6.3 Hz, H-1); 4.46 (dd, 1H, $J_{2,3}$ 7.1, $J_{1,2}$ 6.3 Hz, H-2); 4.13 (ddd, 1H, $J_{3,4}$ 6.9, $J_{4,5a}$ 6.1, $J_{4,5b}$ 4.8 Hz, H-4); 4.08 (dd, 1H, $J_{5a,5b}$ 8.5, $J_{4,5a}$ 6.1 Hz, H-5a); 3.97 (d, 1H, $J_{2,3}$ 7.1, $J_{3,4}$ 6.9 Hz, H-3); 3.94 (dd, 1H, $J_{5a,5b}$ 8.5, $J_{4,5b}$ 4.8 Hz, H-5b); 3.85 (s, 3H, $CH_3$—O); 1.40 (s, 3H, $CH_3$—C); 1.38 (s, 6H, 2 $CH_3$—C); 1.32 (s, 3H, $CH_3$—C).

$^{13}$C-NMR (125 MHz, $CDCl_3$) δ: 147.8 (C-1); 110.8 (C-6); 110.0 (C-7); 79.4(C-3); 76.7 (C-2); 76.6 (C-4); 67.1 (C-5); 62.1 (CH3-O); 27.1, 27.0, 26.9, 25.4 (4 CH3-C).

HRMS (ESI$^+$): [M+H]$^+$ ($C_{12}H_{22}NO_5^+$) Calc. m/z: 260.1492, found: 260.1502.

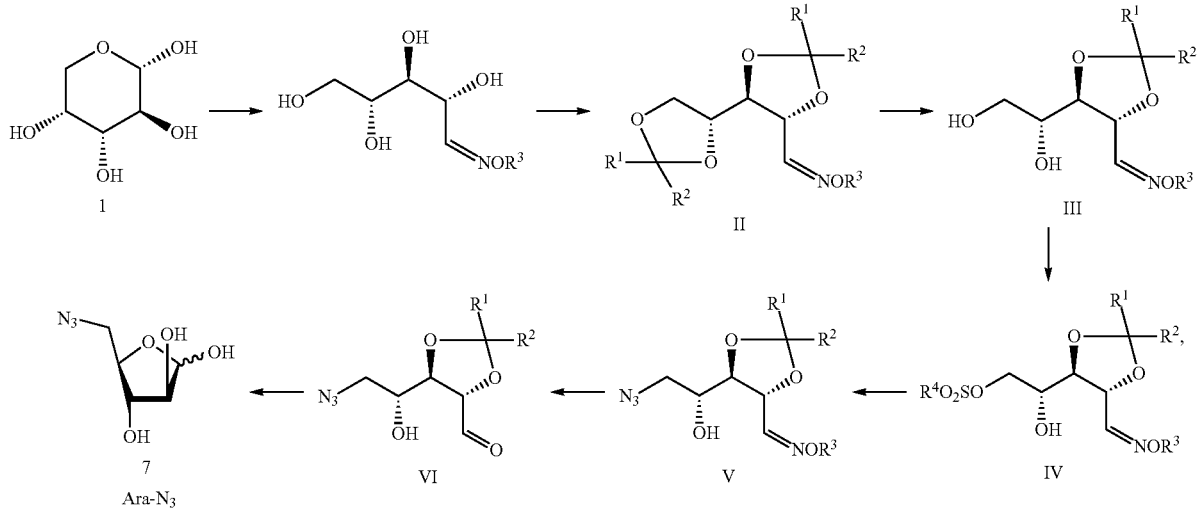

with $R^1$, $R^2$, and $R^3$ being a methyl group.

2:3,4:5-diisopropylidene-D-arabinose O-methyloxime (Compound II)

To a solution of D-(−)-arabinose (4.00 g, 26.6 mmol, 1.0 eq.) in dry pyridine (90 mL) was added methoxyamine hydrochloride (2.72 g, 32.0 mmol, 1.2 eq.) and the mixture was stirred at room temperature for 15 hours. Solvents were removed under reduced pressure and the residue was co-evaporated with toluene three times. The residue was resuspended in 2,2-dimethoxypropane (100 mL) and 7-toluene-

2:3-isopropylidene-D-arabinose O-methyloxime (Compound III)

A solution of 2:3,4:5-diisopropylidene-D-arabinose O-methyloxime (II) (IIE/IIZ) and impurity (1.50 g) in 80% (v/v) aqueous acetic acid (30 mL) was heated to 40° C. at 200 mbar of pressure on a rotavap. After 2.5 hours solvents were removed under reduced pressure and the residue was co-evaporated with toluene. A mixture of isomers 2:3-isopropylidene-D-arabinose O-methyloxime (IIIE/IIIZ) (NMR ratio 4:1, 876 mg, 58% over 3 steps) were obtained after silica gel flash column chromatography (cyclohexane/ethyl acetate 1:1) as colorless oil. Purity of more than 95% by NMR.

Rf (cyclohexane/ethyl acetate 1:1): 0.24.
IR (cm$^{-1}$): 3409, 2939, 1373, 1216, 1040, 885.
HRMS (ESI$^+$): [M+H]$^+$ ($C_9H_{18}NO_5^+$) Calc. m/z: 220.1179, found: 220.1184.
Isomer (IIIE):
$^1$H-NMR (500 MHz, CDCl$_3$) δ: 7.44 (d, 1H, $J_{1,2}$ 5.5 Hz, H-1); 4.56 (dd, 1H, $J_{2,3}$ 7.4, $J_{1,2}$ 5.5 Hz, H-2); 4.07 (dd, 1H, $J_{2,3}$ 7.4, $J_{3,4}$ 5.6 Hz, H-3); 4.13 (ddd, 1H, $J_{3,4}$ 5.6, $J_{4,5}$ 5.1, $J_{4,5}$ 4.7 Hz, H-4); 3.84 (s, 3H, CH$_3$—O); 3.72-3.68 (m, 2H, 2H-5); 1.42 (s, 3H, CH$_3$—C); 1.38 (s, 3H, CH$_3$—C).
$^{13}$C-NMR (125 MHz, CDCl$_3$) δ: 149.1 (C-1); 110.3 (C-6); 79.4 (C-3); 75.0 (C-2); 71.6 (C-4); 63.4 (C-5); 62.2 (CH$_3$—O); 26.9, 26.7 (2 CH$_3$—C).
Isomer (IIIZ):
$^1$H-NMR (500 MHz, CDCl$_3$) δ: 6.86 (d, 1H, $J_{1,2}$ 5.9 Hz, H-1); 4.95 (dd, 1H, $J_{2,3}$ 7.7, $J_{1,2}$ 5.9 Hz, H-2); 3.92 (s, 3H, CH$_3$—O); 3.87 (dd, 1H, $J_{2,3}$ 7.7, $J_{3,4}$ 6.9 Hz, H-3); 3.82-3.75 (m, 2H, H-4, H-5a); 3.72-3.68 (m, 1H, H-5b); 1.40 (2s, 6H, 2 CH$_3$—C).
$^{13}$C-NMR (125 MHz, CDCl$_3$) δ: 151.0 (C-1); 110.9 (C-6); 80.4 (C-3); 72.9 (C-2); 72.7 (C-4); 63.5 (C-5); 62.8 (CH$_3$—O); 27.0, 26.5 (2 CH$_3$—C).

2:3-isopropylidene-5-O-methanesulfonyl-D-arabinose O-methyloxime (Compound IV)

To a solution of 2:3-isopropylidene-D-arabinose O-methyloxime (III) (IIIE/IIIZ) (100 mg, 0.46 mmol, 1.0 eq.) in dry pyridine (2.0 mL) at −20° C., mesyl chloride (0.10 mL, 1.37 mmol, 3.0 eq.) was added and the reaction mixture was stirred for 1.5 hours at −20° C. After quenching the reaction with CH$_3$OH (0.3 mL), solvents were removed under vacuum. The resulting residue was purified by silica flash column chromatography (cyclohexane/ethyl acetate 6:4) to yield a mixture of 2:3-isopropylidene-5-O-methanesulfonyl-D-arabinose O-methyloxime (IVE/IVZ) (NMR ratio 4:1, 110 mg, 81%) as colorless oil. An aliquot of pure (IVE) isomer was obtained by flash column chromatography (dichloromethane/diethyl ether 9:1) and characterized. Purity of more than 95% by NMR.

Rf (cyclohexane/ethyl acetate 6:4): 0.24.
IR (cm$^{-1}$): 3500, 2989, 2941, 2824, 1631, 1458, 1350, 1215, 1170, 1067, 1033, 959, 887, 863, 833.
HRMS (ESI+): [M+H]+($C_{10}H_{20}NO_7S^+$) Calc. m/z: 298.0955, found: 298.0947.
Isomer (IVE):
Rf (cyclohexane/ethyl acetate 6:4): 0.20.
$^1$H-NMR (500 MHz, CDCl$_3$) δ: 7.42 (d, 1H, $J_{1,2}$ 5.6 Hz, H-1); 4.56 (dd, 1H, $J_{2,3}$ 6.8, $J_{1,2}$ 5.6 Hz, H-2); 4.41 (dd, 1H, $J_{5a,5b}$ 11.0, $J_{4,5a}$ 2.7 Hz, H-5a); 4.28 (dd, 1H, $J_{5a,5b}$ 11.0, $J_{4,5b}$ 5.7 Hz, H-5b); 4.03 (ddd, 1H, $J_{3,4}$ 7.0, $J_{4,5b}$ 5.7, $J_{4,5a}$ 2.7 Hz, H-4); 4.01 (dd, 1H, $J_{2,3}$ 6.8, $J_{3,4}$ 7.0 Hz, H-3); 3.85 (s, 3H, CH$_3$—O); 3.06 (s, 3H, CH$_3$—S); 1.41 (s, 3H, CH$_3$—C); 1.39 (s, 3H, CH$_3$—C).
$^{13}$C-NMR (125 MHz, CDCl$_3$) δ: 148.2 (C-1); 110.9 (C-6); 77.9 (C-3); 76.2 (C-2); 70.9 (C-5); 70.8 (C-4); 62.3 (CH$_3$—O); 37.8 (CH$_3$—S); 27.0, 26.9 (2 CH$_3$—C).
Isomer (IVZ):
$^1$H-NMR (300 MHz, CDCl$_3$) δ: 6.87 (d, 1H, $J_{1,2}$ 5.9 Hz, H-1); 4.96 (dd, 1H, $J_{2,3}$ 7.3, $J_{1,2}$ 5.9 Hz, H-2); 4.45 (dd, 1H, $J_{5a,5b}$ 11.4, $J_{4,5a}$ 2.4 Hz, H-5a); 4.29 (dd, 1H, $J_{5a,5b}$ 11.4, $J_{4,5b}$ 7.9 Hz, H-5b); 3.98 (ddd, 1H, $J_{4,5b}$ 7.9, $J_{4,3}$ 7.5, $J_{4,5a}$ 2.4 Hz, H-4); 3.93 (s, 3H, CH$_3$—O); 3.84 (dd, 1H, $J_{3,4}$ 7.5, $J_{3,2}$ 7.3 Hz, H-3); 3.06 (s, 3H, CH$_3$—S); 1.40 (s, 3H, CH$_3$—C); 1.39 (s, 3H, CH$_3$—C).
$^{13}$C-NMR (75 MHz, CDCl$_3$) δ: 150.7 (C-1); 111.2 (C-6); 79.1 (C-3); 72.9 (C-2); 71.3 (C-5); 70.9 (C-4); 62.9 (CH$_3$—O); 37.9 (CH$_3$—S); 27.0, 26.6 (2 CH$_3$—C).

5-azido-5-deoxy-2:3-isopropylidene-D-arabinose O-methyloxime (Compound V)

To a solution of (IVE/IVZ) (810 mg, 2.72 mmol, 1.0 eq.) in N,N-dimethylformamide (30.0 mL, 0.10 M), sodium azide (531 mg, 8.17 mmol, 3.0 eq.) was added and the reaction mixture was heated at 80° C. for 15 hours. Solvent was then removed under reduced pressure and the residue was purified by flash column chromatography (cyclohexane/ethyl acetate 9:1) to yield a mixture of 5-azido-5-deoxy-2:3-isopropylidene-D-arabinose O-methyloxime (VE/VZ) (NMR ratio 7:3, 637 mg, 96%) as yellowish oil. A fraction of (VE) was isolated by flash column chromatography (dichloromethane/MTBE 97:3) for its characterizations. Purity of more than 95% by NMR.

Rf (cyclohexane/ethyl acetate 8:2): 0.30.
IR (cm$^{-1}$): 3458, 2989, 2939, 2823, 2100, 1630, 1443, 1373, 1213, 1164, 1066, 1036, 885, 865.
HRMS (ESI$^+$): [M+H]$^+$ ($C_9H_{17}N_4O_4^+$) Calc. m/z: 245.1245, found: 245.1250.
Isomer (VE):
Rf (dichloromethane/MTBE 97:3): 0.23.
$^1$H-NMR (500 MHz, CDCl$_3$) δ: 7.42 (d, 1H, $J_{1,2}$ 5.8 Hz, H-1); 4.54 (dd, 1H, $J_{2,3}$ 7.2, $J_{1,2}$ 5.8 Hz, H-2); 3.98 (dd, 1H, $J_{2,3}$ 7.2, $J_{3,4}$ 6.4 Hz, H-3); 3.92 (dddd, 1H, $J_{3,4}$ 6.4, $J_{4,5b}$ 6.2, $J_{4,OH}$ 3.9, $J_{4,5a}$ 3.8 Hz, H-4); 3.85 (s, 3H, CH$_3$—O); 3.46 (dd, 1H, $J_{5a,5b}$ 12.5, $J_{4,5a}$ 3.8 Hz, H-5a); 3.42 (dd, 1H, $J_{5a,5b}$ 12.5, $J_{4,5b}$ 6.2 Hz, H-5b); 2.61 (d, 1H, $J_{4,OH}$ 3.9 Hz, OH); 1.41 (s, 3H, CH$_3$—C); 1.39 (s, 3H, CH$_3$—C).
$^{13}$C-NMR (125 MHz, CDCl$_3$) δ: 148.4 (C-1); 110.6 (C-6); 78.8 (C-3); 75.8 (C-2); 71.5 (C-4); 62.3 (CH$_3$—O); 53.7 (C-5); 27.0, 26.8 (2 CH$_3$—C).
Isomer (VZ):
$^1$H-NMR (500 MHz, CDCl$_3$) δ: 6.86 (d, 1H, $J_{1,2}$ 6.1 Hz, H-1); 4.94 (dd, 1H, $J_{2,3}$ 7.2, $J_{1,2}$ 6.1 Hz, H-2); 3.93 (s, 3H, CH$_3$—O); 3.87 (ddd, 1H, $J_{3,4}$ 7.5, $J_{4,5b}$ 6.4, $J_{4,5a}$ 2.8 Hz, H-4); 3.82 (dd, 1H, $J_{3,4}$ 7.5, $J_{2,3}$ 7.2 Hz, H-3); 3.47 (dd, 1H, $J_{5a,5b}$ 12.8, $J_{4,5a}$ 2.8 Hz, H-5a); 3.39 (dd, 1H, $J_{5a,5b}$ 12.8, $J_{4,5b}$ 6.4 Hz, H-5b); 1.40 (s, 3H, CH$_3$—C); 1.38 (s, 3H, CH$_3$—C).
$^{13}$C-NMR (75 MHz, CDCl$_3$) δ: 150.8 (C-1); 111.0 (C-6); 80.0 (C-3); 72.9 (C-2); 72.5 (C-4); 62.8 (CH$_3$—O); 53.5 (C-5); 26.9, 26.5 (2 CH$_3$—C).

5-azido-5-deoxy-2:3-isopropylidene-D-arabinose (Compound VI)

To a solution of (VE/VZ) (820 mg, 3.36 mmol, 1.0 eq.) in 80% (v/v) aqueous acetic acid (120 mL), formaldehyde (0.8 mL) was added and the reaction mixture was stirred for 1 hour at room temperature. Solvents were removed under reduced pressure and co-evaporation with toluene was done to assure complete elimination of acetic acid. The crude compound 5-azido-5-deoxy-2:3-isopropylidene-D-arabinose (VI) (682 mg) was obtained.
Colorless Oil
Rf (cyclohexane/ethyl acetate 7:3): 0.56.
IR (cm$^{-1}$): 3408, 2988, 2936, 2100, 1733, 1440, 1373, 1238, 1213, 1164, 1063, 863.
$^1$H-NMR (500 MHz, CDCl$_3$) δ: 9.79 (d, 1H, $J_{1,2}$ 1.2 Hz, H-1); 4.41 (dd, 1H, $J_{2,3}$ 6.4, $J_{1,2}$ 1.2 Hz, H-2); 4.04 (dd, 1H, $J_{2,3}$ 6.4, $J_{3,4}$ 6.1 Hz, H-3); 3.90 (ddd, 1H, $J_{4,5b}$ 6.4, $J_{3,4}$ 6.1, $J_4$,5a 3.4 Hz, H-4); 3.51 (dd, 1H, $J_{5a,5b}$ 12.8, $J_{4,5a}$ 3.4 Hz, H-5a); 3.43 (dd, 1H, $J_{5a,5b}$ 12.8, $J_{4,5b}$ 6.4 Hz, H-5b); 1.47 (s, 3H, $CH_3$—C); 1.37 (s, 3H, $CH_3$—C).

HRMS (ESI$^+$): [2M+Na]$^+$ ($C_{16}H_{26}N_6NaO_8^+$) Calc. m/z: 453.1704, found: 453.1726.

5-azido-5-deoxy-D-arabinofuranose (Compound VII, Ara-$N_3$)

To a solution of 5-azido-5-deoxy-2:3-isopropylidene-D-arabinose (VI) (100 mg) in a mixture of $CH_2Cl_2/H_2O$ (20:1, 21 mL), trifluoroacetic acid (1 mL) was added and the mixture was stirred at room temperature for 1 hour. Solvents were then evaporated, the crude residue was resuspended in water and lyophilized. After silica flash column chromatography (dichloromethane/methanol 92:8), the compound 5-azido-5-deoxy-D-arabinofuranose or Ara-$N_3$ (VII) (50 mg, 58% over 2 steps from compound (V)) was obtained as a mixture of /β anomers (NMR ratio 55:45) as a colorless oil. Purity of more than 95% by NMR.

Rf (dichloromethane/methanol 92:8): 0.28.

IR (cm$^{-1}$): 3367, 2106, 1281, 1040.

HRMS (ESI$^+$): [M+H-$N_2$]$^+$ ($C5H10NO_4^+$) Calc. m/z: 148.0604, found: 148.0610.

Anomer Alpha (VIIα):

$^1$H-NMR (500 MHz, $D_2O$) δ: 5.24 (d, 1H, $J_{1,2}$ 2.9 Hz, H-1); 4.17 (ddd, 1H, $J_{3,4}$ 6.4, J4,$_{5b}$ 5.8, $J_{4,5a}$ 3.5 Hz, H-4); 4.01 (dd, 1H, $J_{2,3}$ 4.6, $J_{1,2}$ 2.9 Hz, H-2); 3.97 (dd, 1H, $J_{3,4}$ 6.4, $J_{3,2}$ 4.6, H-3); 3.64 (dd, 1H, $J_{5a,5b}$ 13.6, $J_{4,5a}$ 3.5 Hz, H-5a); 3.44 (dd, 1H, $J_{5a,5b}$ 13.6, J4,5b 5.8 Hz, H-5b).

$^{13}$C-NMR (125 MHz, $D_2O$) δ: 101.0 (C-1); 81.3 (C-4); 81.2 (C-2); 76.3 (C-3); 51.5 (C-5).

Anomer Beta (VIIβ):

$^1$H-NMR (500 MHz, $D_2O$) δ: 5.28 (br d, 1H, $J_{1,2}$ 3.1 Hz, H-1); 4.10-4.05 (m, 2H, H-2, H-3); 3.89 (ddd, 1H, $J_{3,4}$ 7.1, $J_{4,5b}$ 6.5, $J_{4,5a}$ 3.5 Hz, H-4); 3.59 (dd, 1H, $J_{5a,5b}$ 13.3, $J_{4,5a}$ 3.5 Hz, H-5a); 3.42 (dd, 1H, $J_{5a,5b}$ 13.3, $J_{4,5b}$ 6.5 Hz, H-5b).

$^{13}$C-NMR (125 MHz, $D_2O$) δ: 95.2 (C-1); 79.6 (C-4); 75.8 (C-2); 74.7 (C-3); 52.6 (C-5).

Example 2: Labeling of Bladder Non-Tumoral and Tumoral Eukaryotic Cells

Material and Methods:

Cell Culture:

The human uroepithelial cells (SV-HUC-1) and the human urinary bladder carcinoma (T24) were purchased from ATCC (Manassas, Van USA). These cell lines were grown in RPMI 1640 with Glutamine 1 medium (Lonza Biowhttaker) supplemented by 10% fetal bovine serum (FBS) (VWR international S.A.S). The culture medium was changed every two days. The passaging of cells was performed using Tryp-LE express 1× (Gibco). The cell viability was estimated using trypan blue exclusion tests.

Cell Exposure to Ara-$N_3$ Probe:

SV-HUC-1 and T24 cells were seeded in 24-well plates, at density of 5*10$^4$ cells/well. Then, cells were incubated at 37° C., 5% in $CO_2$ during 24 hours. Thereafter, the culture medium of each well was discarded, and attached cells were washed twice with Phosphate Buffer Salin (PBS) (Lonza Biowhittaker), before to be exposed to Ara-$N_3$ probe (10 mM). Probe was added to culture medium with different FBS concentrations (3% and 10%). Then, cells were incubated at 37° C., 5% in $CO_2$ for 24 hours again. The control cells were cultured using culture medium supplemented with 5% or 10% FBS, without addition of Ara-$N_3$.

Labeling with Anti-Biotin Antibodies:

The fluorescence Assimilation of Ara-$N_3$ probes was visualized by copper-free click chemistry using sulfo-DBCO-biotin (1 mM), followed by labeling with a mouse anti-biotin Alexa Fluor 488 antibody conjugate (0.62 mg/ml stock, Jackson ImmunoResearch, dilution 1/10). The click reaction was carry-out as following: At 24 h incubation times, the culture mediums were removed, and attached cells were washed twice with PBS. Cells were detached with Tryp-LE, washed twice with PBS, and centrifuged at 13000 g for 2 min. The cellular pellets were resuspended with 10 µL of sulfo-DBCO-biotin and incubated 30 min in the dark, and at 37 C°. Then, cells were washed twice with PBS, centrifuged, and cellular pellets were resuspended with 10 µL of a mouse anti-biotin antibody solution, before to be incubated at room temperature in dark. Thereafter, cells were washed twice with PBS and small cellular suspension spots (5 µL) were put in Polysine® adhesion slides (VWR international S.A.S), in the dark room, until dry (20 min). The spots were fixed with 4% paraformaldehyde during 20 min, in dark and room temperature. Slides were then washed twice with PBS, before recovering with square cover glasses (VWR international S.A.S) using glycerol Mounting Medium (Dako) and stored at 4° C. in dark room.

Fluorescence Microscopy:

The fluorescence acquisition was recorded using Olympus Microscopy IX83 (Olympus Life Science) equipped with a 60×/1.3 digital opening/1.4 SRI (silicone refractive index) objective, and Hamamatsu oreca flash 4 LT camera with 109 nm/pixel calibrated pixel size. The excitation light was emitted by X-CITE 120LED using the AT180/30X excited filter and signal was monitored using AT535/40m emission filter. Green light exposition time was 600 ms and white light exposition time was determined by DIC methods at 340 ins. The acquisition area size analyzed by the Celisens dimension V1.16 software was different depending on the cell number containing in the spot.

Image Processing and Fluorescence Quantification:

The images were processed using count and measure unit of the Cellsens dimension V1.16 software. The background noise was deleted as follows: ROI were first defined on the background of the image and the average pixel intensity was calculated. The value thus obtained was subtracted from all pixels of the image. The fluorescence intensity of each cell was determined from a threshold set at a value of 3030. All pixels that have intensity below 3030 were not counted.

Results:

TABLE 1

Evaluation of the labelled cells % at 24 h – FBS concentration 3%

| Intensity/µm$^2$ | SV-HUC1 % (n = 239) | T24 % (n = 226) |
|---|---|---|
| 0-50000 | 62.34 | 2.21 |
| 50,000-100,000 | 2.51 | 2.65 |
| 100,000-150,000 | 2.09 | 2.65 |
| 150,000-200,000 | 1.26 | 5.75 |
| 200,000-250,000 | 1.67 | 3.98 |
| 250,000-300,000 | 3.77 | 3.54 |
| 300,000-350,000 | 0.42 | 2.21 |
| 350,000-400,000 | 0.42 | 3.98 |
| 400,000-450,000 | 0.84 | 2.65 |
| 450,000-500,000 | 2.93 | 3.54 |
| >500,000 | 21.76 | 66.81 |

TABLE 2

Evaluation of the labelled cells % at 24 h – FBS concentration 10%

| Intensity/μm² | SV-HUC1 % (n = 301) | T24 % (n = 282) |
|---|---|---|
| 0-50,000 | 73.45 | 1.42 |
| 50,000-100,000 | 4.32 | 2.13 |
| 100,000-150,000 | 1.66 | 2.48 |
| 150,000-200,000 | 1.33 | 1.42 |
| 200,000-250,000 | 0.66 | 2.13 |
| 250,000-300,000 | 0.66 | 1.42 |
| 300,000-350,000 | 0.33 | 1.77 |
| 350,000-400,000 | 0.66 | 2.48 |
| 400,000-450,000 | 0.66 | 3.19 |
| 450,000-500,000 | 1.33 | 2.13 |
| >500,000 | 14.62 | 79.43 |

The results of the tables 1 and 2 show a greater labeled-cells % for the T24 cells compared to the SV-HUC1 cells after 24 hours, thereby demonstrating a greater assimilation of the Ara-N3 probes for the tumoral bladder cells. More specifically, at intensity/μm² higher than 500,000, SV-HUC1% is 21.76 and T24% is 66.81 at FBS concentration 3% and SV-HUC1% is 14.62 and T24% is 79.42 at FBS concentration 10%, whereas at low intensity the obtained labeled-cell % are the opposite. The overall distributions of intensities vary between normal and cancer cells.

Example 3: Labeling of Non-Cancer and Cancer Eukaryotic Cells

Material and Methods:

The same experiments as in example 2 with other cancer and corresponding non cancer cells were performed. The culture media were adapted to the tested cells and supplemented by 10% fetal bovine serum (FBS). Ara-N$_3$ probe (10 mM) was added to culture media with FBS concentration (10%). The incubation times corresponded to one doubling time or twice doubling time of the tested cells (see table below).

The fluorescence signal cancer/non cancer ratios were calculated based on fluorescence intensities obtained with Ara-N3 tested on cancer and corresponding non cancer cells.

Results:

The results are presented below (Table 3) and show higher fluorescence intensities for the tested cancer cell lines in comparison to the corresponding non-cancer cell lines (ratio higher than 1).

| Human Cancer cell Line | Organ | Disease | Doubling time | Human non Cancer cell line | Organ | Doubling time | Cancer/Non Cancer Ratio | |
|---|---|---|---|---|---|---|---|---|
| THP1 | Blood | monocytic acute leukemia | 26 h | Monocytes/Macrophages | Blood | 26 h | 19.5 | |
| KCL22 | Blood | chronic myelogenous leukemia | 24 h | Lymphocytes | Blood | 24 h | 4.9 | |
| A431 | Skin | Epidermoid carcinoma | 30 h | Hacat | Skin | 30 h | 17.5 | |
| A375 | Skin | Malignant melanoma | 26 h | PIG | Skin | 26 h | 3.5 | |
| PANC | Pancreas | Pancreatic carcinoma | 32 h | HPNE | Pancreas | 32 h | 1.8 | |
| NAMALWA | Lymphocyte B | Epstein-Barr virus-related Burkitt lymphoma | 20 h | B12-F8 | Lymphocyte B | 24 h | 2.3 | |
| Kasumi-1 | Blood | Acute Myeloid Leukemia | 48 h | B12-F8 | Blood | 24 h | 1.5 | |
| K562 | Blood | Chronic Myeloid Leukemia | 24 h | Lymphocytes T | Blood | 24 h | 1.6 | |
| HL-60 | Blood | Acute Myeloid Leukemia | 28 h | Lymphocytes T | Blood | 24 h | 1.6 | |
| RS4 | Blood | Acute lymphoblastic leukemia | 35 h | Lymphocytes T | Blood | 24 h | 1.6 | |
| HT29 | colon | Colorectal adenocarcinoma | 40 h | Colon epithelial cell | colon | 40 h | 13.2 | test at 2 doubling time |
| AGS | Stomach | Gastric adenocarcinoma | 30 h | Stomach epitelial cell | Stomach | 30 h | 2.9 | test at 2 doubling time |
| MDA-MB-231 | Breast | Breast adenocarcinoma | 40 h | Breast epithelial cell | Breast | 40 h | 2.5 | test at 2 doubling time |
| A549 | Lung | Carcinoma | 40 h | Bronchial epithelial cell | Lung | 40 h | 7.7 | test at 2 doubling time |
| BL-2 | Blood | non-endemic Burkitt lymphoma | 24 h | Isolated primary B cells | Blood | | 2.5 | |
| DOHH-2 | Blood | Diffuse large B-cell lymphoma germinal center B-cell type | 40-48 h | Isolated primary B cells | Blood | | 7.4 | |
| OCI-Ly3 | Blood | Diffuse large B-cell lymphoma | 24 h | Isolated primary B cells | Blood | | 6.2 | |
| OCI-Ly10 | Blood | Diffuse large B-cell lymphoma | 24 h | Isolated primary B cells | Blood | | 2.1 | |
| SU-DHL-4 | Blood | Diffuse large B-cell lymphoma germinal center B-cell type | 40 h | Isolated primary B cells | Blood | | 2.5 | |
| MDA MB175 | Breast | Breast cancer | 30 h | HME-1 | Breast | 30 h | 2 | |
| MDA MB453 | Breast | Breast cancer | 30 h | HME-1 | Breast | 30 h | 2.2 | |
| SK-BR-7 | Breast | Breast cancer | 30 h | HME-1 | Breast | 30 h | 2.1 | |

The same experiments were implemented with other human cancer cells, including more specifically the following ones (Table 4) in comparison with matched non-cancer cells:

TABLE 4

| Human cancer cell line | Organ | Disease |
| --- | --- | --- |
| U87 | Brain | Glioblastoma |
| HUH6 | Liver | Hepatoblastoma |
| HUH7 | Liver | Liver carcinoma |
| 786-O | Kidney | Renal cell carcinoma |
| NCI-H28 | Lung | Pleural sarcomatoid mesothelioma |
| SW 684 | Muscle | Fibrosarcoma |
| IMR-32 | Brain | Neuroblastoma |
| MDA PC a 2b | Prostate | Adenocarcinoma |
| AGS | Stomach | Gastric adenocarcinoma |
| Kato III | Stomach | Gastric carcinoma |
| NCI-N87 | Stomach | Gastric carcinoma |

It is expected to obtain the same results as in Table 3, i.e. higher fluorescence intensities for the tested cancer cell lines in comparison to the corresponding non-cancer cell lines (in particular a ratio higher than 1).

Example 4: Comparison of Labeling of Ara-$N_3$ and KDO-$N_3$

KDO-$N_3$ (8-azido-3,8-dideoxy-D-manno-octulosonic acid) is described in patent application WO2013/107759 as a useful tool to label bacteria.

Ara-N3 and KDO-$N_3$ were assayed under the same conditions as in example 2 with other human cells lines: HeLa, Raw and Macrophages.

Said cell lines were not labelled with KDO-$N_3$ (no fluorescence intensity observed) whereas said cell lines were labelled with Ara-$N_3$.

Example 5: Non-Toxicity of Ara-$N_3$ Probe Towards Cells (In Vitro/In Vivo)

A—In Vitro Experiments

Materials and Methods

Ara-N3 probe was prepared as detailed above.

The cell lines (as detailed below in the table) were provided by Inserm/Aquiderm transfer cell. Cell culture of cell lines and cell cytoxicity tests were also carried out by Aquiderm transfer cell, in the laboratory of INSERM U1035.

Isolation of Peripheral Blood Mononuclear Cells (Monocytes/Lymphocytes)

Human mononucleated cells were isolated from peripheral blood from 2 different healthy donors by convention established with the Etablissement Frangais du Sang d'Aquitaine. The technique used was Ficoll gradient isolation. Briefly, the blood diluted in a phosphate buffered saline solution (PBS) was deposited on a sucrose solution (Ficoll, Eurobio) and centrifuged in order to separate the different blood elements. Between Ficoll and plasma was established a cell ring composed of monocytes and lymphocytes. This was recovered and washed in PBS for counting on the Malassez cell.

Human CD14+monocytes were isolated from lymphocytes by magnetic beads coupled to an anti-CD14 antibody (Miltenyi Biotech). The mononuclear cells were incubated for 15 minutes, in PBS buffer, in the presence of a determined concentration of beads depending on the number of cells. The cells were then washed in PBS and then placed on a column mounted on a strong magnet. The CD14+cells, which are attached to an anti-CD14 magnetic ball, can remain attached to the column. After washing it, the column was removed from the magnetic support and the cells were unhooked by washing the column in PBS buffer.

The number of monocytes was determined by counting on the Malassez cell.

Cell Culture

The cells were cultivated in an oven at 37° C., 5% $CO_2$ and 95% humidity, in different culture media:
- either in RPMI 1640 medium supplemented with 10% of decomplemented FCS (Fetal calf serum) and antibiotics penicillin (100 IU/ml) and streptavidin (100 µg/ml), for the pair Monocytes/THP1.
- either in DMEM medium supplemented with 10% of decomplemented FCS and antibiotics penicillin (100 IU/ml) and streptavidin (100 µg/ml) for the Hacat/A431 couple.

The culture medium was changed every 2 days throughout the study.

When the cultures reached 70-80% confluence, the adherent cells were detached with 10% trypsin-EDTA. Cell viability was assessed by the trypan blue exclusion test.

Contact with Ara-N3 Probe

All the cells were seeded in culture plates, either in 96 wells at the density of $1*10^4$ cells/well for the MTS proliferation test, either in 24 wells at the density of $5*10^4$ cells/well for the Annexin V test/IP test. Then the cells were incubated at 37° C. and 5% $CO_2$ for 24 hours. After 24 hours, the culture medium was changed in all the wells and the cells adhered to the bottom of the wells were rinsed twice in PBS (Eurobio) or centrifuged and washed twice in PBS for the cells in suspension, before being exposed to the Ara-N3 probe at different concentrations: 1, 10, 50 and 100 mM. The cells were incubated at 37° C. and 5% $CO_2$ for 48 hours.

The control cells were cultured with supplemented culture medium, without addition of Ara-N3 probe.

Annexin V/IP Cytotoxicity Test

This test requires the use of an Annexin V-APC kit (Biolegend) for the detection of apoptosis/necrosis. This test uses the ability of Annexin V to bind to membrane phosphatidylserines (PS) and the intercalating properties of propidium iodide (PI) on DNA.

Concretely, a viable cell expresses PS on the inner layer of its membrane bilayer. PS are therefore inaccessible to Annexin V-APC. Likewise, the cell retains the integrity of its DNA away from the nucleus, making DNA also inaccessible to IP. When the cell enters apoptosis (programmed cell death), a series of events occurs. Among them, there is an inversion of the layers of the cytoplasmic membrane. The PS, which were exposed on the internal membrane, are found on the external membrane of the vesicles formed by degradation of the lipid bilayer. They can therefore fix an Annexin V-APC molecule and emit a fluorescence at 660 nm which will be detectable by flow cytometry.

During the process of apoptosis, the cells will then go into necrosis. There is degradation of the nuclear membrane and release of DNA into the culture medium. The PI can be inserted between the bases of the DNA and emit a second fluorescence at 370-550 nm also detectable by flow cytometry.

Briefly, after incubation of the cells with the Ara-N3 probe at different concentrations and at different times (24 h and 48 h), the cells were recovered, trypsinized (for adherent cells)

and washed in PBS. After counting in trypan blue on the Malassez cell, the cells were incubated in a labeling buffer (100 µL) in the presence of Annexin V-APC (5 µL) and of IP (10 µL) for 15 minutes at room temperature and in the dark. They were then directly analyzed by cytometry after adding 100 µL of labeling buffer.

The non-toxic concentrations of Ara-N3 with respect to the tested cells are gathered in the following Table 5.

B—In Vivo Experiments

Materials and Methods

Ara-$N_3$ probe was prepared as detailed above.

Ten Female NMRI nude mice (6 weeks old, Janvier, Le Genest-Saint Isle, France) were enrolled in this assay. Three were injected intravenously every other day for 8 days (4 injections) with 50 mg/mouse/injection of Ara-N3 for 200 mg cumulative dose, and three other mice were treated for 8 days with 50 mg of Ara-N3 in 8 mL of water consumed per day, for 400 mg cumulative dose. As control groups, four tumor-bearing mice were not treated.

Mice were euthanized and dissected at the end of treatment. Heart, lung, brain, uterus, ovaries, kidney, skeletal muscle, spleen, pancreas, abdominal fat, liver, skin, stomach, colon, caecum, small intestine, mesenteric lymph nodes, axillary lymph nodes, brachial lymph nodes and total blood were harvested and frozen for analyses.

Results

The introduction of Ara-N3 in drinking water (up to 6.25 mg/mL) did not alter the water consumption of the mice.

Treatment with Ara-N3, either in drinking water or by intravenous injections, did not induce any body weight loss.

TABLE 5

| | (in vitro/in vivo) | |
|---|---|---|
| | Cell lines/Cell type/model | Non-toxic concentration of Ara-$N_3$ |
| In vitro | HACAT (immortalized cell lines) | >10 mM |
| | A431 (tumoral cell lines) | >10 mM |
| | Macrophage (primary cells) | >10 mM |
| | THP1 (tumoral cell lines) | >10 mM |
| | HME1 (immortalized cell lines) | >1 mM |
| | MDA MB175 (tumoral cell lines) | >1 mM |
| | MDA MB231 (tumoral cell lines) | >1 mM |
| | MDA MB453 (tumoral cell lines) | >1 mM |
| In vivo | Nude mouse (mice) | >1 mM |

Example 6: Specific Labeling of Ara-$N_3$ Probe Towards Tumoral Cell Lines (In Vivo)

Materials and Methods

All animal experiments were performed in accordance with the institutional guidelines of European Economic Community for the use of laboratory animals (EU Directive 2010/63/EU) and were authorized by the French Ministry of Higher Education and Research under the reference APAFIS #8854-2017031314338357.

Subcutaneous Tumor Xenografts

Females NMRI nude mice (6 weeks old, Janvier, Le Genest-Saint Isle, France) were injected subcutaneously in the flank with 8×10$^6$ Panc-1 cells in 1×PBS.

Ara-N3 Treatment by Intravenous Injections:

20 mg Ara-N3 cumulative doses was evaluated.

10 days after tumor cells implantation, Panc-1 tumor-bearing mice were treated every other day for 21 days (11 injections) with 1.8 mg/mouse/injection of Ara-N3 for 20 mg cumulative dose respectively (n=3 mice per dose).

No Treatment:

As control groups, three tumor-bearing mice per cell line were not treated (Ctr).

Contrast Agent Administration

DBCO-IRDye800CW

Mice treated by intravenous injections

Two Panc-1 tumor-bearing mice per treatment condition were injected intravenously with 100 µg of DBCO-IRDye800CW 24 hours after the last treatment injection (Ara-N3+Fluo).

Control mice

One non-treated Panc-1 tumor-bearing mouse was injected intravenously with 100 µg of DBCO-IRDye800CW (Ctr+Fluo).

Fluorescence Imaging Data Analysis (Ex Vivo)

Mice were euthanized and dissected at 48 hours post injection of DBCO-IRDye800CW. Ex vivo fluorescence imaging was performed on skeletal muscle and tumor.

Semi-quantitative data were obtained from fluorescence images by manually drawing Regions of Interest (ROI) adjusted on the tumor area to be quantified. The total fluorescence signal measured in the ROI is divided by the number of pixels in the ROI. Data are thus expressed as relative fluorescence unit (RLU) per pixel on skeletal muscle and tumor. The fluorescence signal ratio of tumor and skeletal muscle is then calculated (Tumor/Muscle ratio).

The results are given in FIG. 1.

The invention claimed is:

1. An in vitro or ex vivo method for labeling, detecting, or targeting an eukaryotic cell from a multicellular organism, the method comprising the steps of:
   a) contacting a sample comprising eukaryotic cells with at least one modified monosaccharide compound or a precursor thereof;
   b) contacting the sample of step (a) with a compound bearing a first reactive group, optionally in presence of copper; and
   c) optionally detecting the compound of step (b) bond to the monosaccharide of step (a), as to detect eukaryotic cells;
wherein said at least one modified monosaccharide compound has the following formula (I):

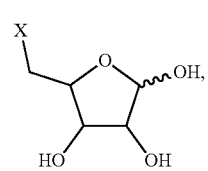

(I)

in which X is a second reactive group, the first and the second reactive groups being able to react together in a click chemistry reaction, wherein the click chemistry is selected from azide-alkyne cycloaddition click chemistry, copper-free click-chemistry, thiol-ene click chemistry, nitrile-oxideene click chemistry, nitrile imine-ene click chemistry and isonitrile-tetrazine click chemistry.

2. The method according to claim 1, wherein the second reactive group X is an azido group (—N₃) and the first reactive group is an alkyne group.

3. The method according to claim 1, wherein said at least one modified monosaccharide compound of formula (I) is selected in the group consisting of the following formulae:

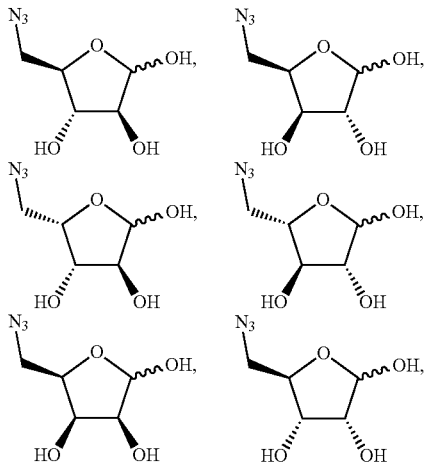

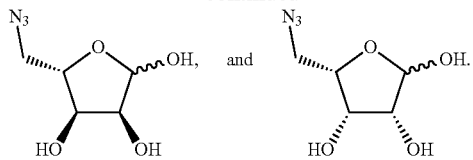

4. The method according to claim 1, wherein said at least one modified monosaccharide compound of formula (I) is 5-azido-5-deoxy-D-arabinofuranose having the following formula:

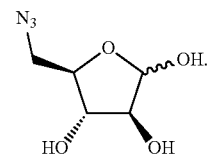 [SMILES: [N-]=[N+]=NC[C@H]1OC(O)[C@@H](O)[C@@H]1O]

* * * * *